Patented Feb. 6, 1951

2,540,998

UNITED STATES PATENT OFFICE 2,540,998

AZEOTROPIC DEHYDRATION OF 1,1'-OXY-BIS-(2-CHLOROETHANOL)

Stephen C. Stowe, Midland, Mich., assignor to The Dow Chemical Company, Midland, Mich., a corporation of Delaware No Drawing. Application July 15, 1948, Serial No. 38,947

8 Claims. (Cl. 260—601)

This invention concerns an improved method of dehydrating 1,1'-oxybis-(2-chloroethanol) to form chloroacetaldehyde. It relates more particularly to the production of anhydrous chloroacetaldehyde by dehydration of concentrated aqueous chloroacetaldehyde and 1,1'-oxybis-(2-chloroethanol) solutions.

It is known to prepare chloroacetaldehyde by introducing chlorine and vinyl chloride in the gaseous state into water at cool to moderate temperatures, e. g. at from 0° C. to 40° C. Recovery of the chloroacetaldehyde from the dilute aqueous acid solution has heretofore been accomplished by increasing the concentration of hydrogen chloride in the reaction mixture to approximately 20 per cent and thereafter distilling the aqueous acid mixture to obtain chloroacetaldehyde in a concentration of from 70 to 80 per cent. By passing the distillate vapors over a layer of calcium chloride, heated to 100° C., anhydrous chloroacetaldehyde has been obtained. However, this known mode of dehydrating the chloroacetaldehyde is costly and inconvenient. When the concentrated aqueous solution of 70 to 80 per cent chloroacetaldehyde is redistilled and the vapors condensed directly, there is obtained a product, distilling at 85°–85.5° C. at atmospheric pressure, which has heretofore been referred to as a hydrate of chloroacetaldehyde. The product crystallizes to a solid at room temperature, has a chemical composition corresponding to the formula $CH_2Cl \cdot CHOH \cdot O \cdot CHOH \cdot CH_2Cl$, and may be named 1,1'-oxybis-(2-chloroethanol).

Attempts to convert this material to anhydrous chloroacetaldehyde by usual dehydration procedures such as treatment of the material in liquid form with solid drying agents, e. g. calcium chloride, sodium hydroxide, calcium sulfate, anhydrous sodium sulfate, activated alumina, etc., results in failure, or poor yields of chloroacetaldehyde product. Extraction of the material with organic solvents such as ethylene dichloride, benzene, toluene, ethylbenzene, hexane, tetrachloroethylene, beta,beta'-dichloro-diethyl ether, etc., fails to produce anhydrous chloroacetaldehyde. The compound was found to be either completely miscible with, or substantially insoluble in, the organic liquids which were tested. Extraction of concentrated aqueous chloroacetaldehyde solutions, i. e. containing 50 per cent by weight or more of chloroacetaldehyde, with water-immiscible organic solvents either fails to produce anhydrous chloroacetaldehyde or the proportion of chloroacetaldehyde extracted is so small as to render the process impractical for industrial use. Apparently, such solution contains little, if any, chloroacetaldehyde as such, but instead contains its derivative, 1,1'-oxybis-(2-chloroethanol). For convenience, such solution will be referred to herein as a chloroacetaldehyde solution, it being understood, however, that the organic solute is present principally as 1,1'-oxybis-(2-chloroethanol). Treatment of concentrated aqueous solutions of chloroacetaldehyde with a solid alkali, e. g. sodium hydroxide, results in rapid polymerization of the chloroacetaldehyde and usually, separation of the solution into an aqueous layer and a sticky polymeric layer. Other of the usual solid drying agents such as calcium chloride, calcium sulfate, magnesium sulfate, etc., when added to concentrated aqueous solutions of chloroacetaldehyde fail to dehydrate the solution to form anhydrous chloroacetaldehyde.

I have found that aqueous chloroacetaldehyde of from 50 to 85 per cent concentration may be distilled under vacuum directly from the dilute aqueous mixture, resulting from the reaction between vinyl chloride, chlorine and water. By carrying such distillation out under vacuum, e. g. at from 100 to 300 mm. of Hg absolute pressure, the step, heretofore considered necessary, of first enriching the reaction mixture with hydrochloric acid may be omitted. As mentioned above, the chloroacetaldehyde in the concentrated solution obtained as distillate is largely combined with water as 1,1'-oxybis-(2-chloroethanol).

I have further found that 1,1'-oxybis-(2-chloroethanol) can be dehydrated to form chloroacetaldehyde in good yield, by heating the compound, or a concentrated aqueous solution of the compound, in admixture with an entraining agent, consisting of an inert water-immiscible organic liquid having a boiling point below 70° C. at atmospheric pressure, and removing by distillation, water, together with a portion of the entraining agent. Apparently, a reaction of splitting water from the 1,1'-oxybis-(2-chloroethanol) molecule to form chloroacetaldehyde occurs quite rapidly at temperatures in the order of from 40° to 70° C. and the chloroacetaldehyde product is stable at these temperatures. However, the reaction is of an equilibrium type and water must be removed as it is formed for the reaction to be observable or to permit recovery of the chloroacetaldehyde product.

The process as a whole may be carried out in a series of steps comprising, (1) distilling at subatmospheric pressure the dilute aqueous reaction mixture, prepared by causing vinyl chloride and chlorine to react in admixture with water, to obtain aqueous chloroacetaldehyde of from 50 to 85 per cent concentration, as distillate; (2) adding as an entraining agent a water-immiscible organic liquid, having a boiling point below 70° C. at atmospheric pressure, to the concentrated aqueous chloroacetaldehyde solution; (3) heating the mixture to distill therefrom water, together with a portion of the entraining agent; and (4) recovering anhydrous chloroacetaldehyde from the residual water-immiscible entraining agent.

The inert water-immiscible organic liquids that may be employed in the above step (3) as entraining agents to remove water by distillation should be solvents for chloroacetaldehyde and preferably have boiling points at atmospheric pressure between 50° C. and 70° C., although solvents having boiling points of from 40° C. to 70° C. may be used. They should be inert to the chloroacetaldehyde at the temperatures employed. Preferably, the solvents are saturated aliphatic chlorohydrocarbons containing from one to three chlorine atoms in the molecule. Examples of such inert water-immiscible organic liquids suitable for use in said step as entraining agents are chloroform, sec.-butyl chloride, methylene chloride, nor.-propyl chloride and ethylidene chloride. The entraining agent should, of course, be easily separated from the chloroacetaldehyde. Water-immiscible organic liquids that form constant boiling mixtures with chloroacetaldehyde are not operable in the process.

The proportion of entraining agent employed to remove the water by distillation may vary within wide limits. A sufficient amount of the entraining agent is usually employed so that the temperature in the distillation vessel does not become greater than the boiling point of 1,1'-oxybis-(2-chloroethanol). In batch distillation, the process may advantageously be carried out by using from 0.5 to 10 parts by weight of entraining agent per part of concentrated aqueous chloroacetaldehyde solution or per part of 1,1'-oxybis-(2-chloroethanol) used, and separating the entraining agent from the distillate and returning it to the distillation vessel. In a continuous process wherein the entraining agent is separated from the distillate and returned to the distillation column, after operation of the process for a short while, an inventory of entraining agent is accumulated in the system, which is continuously recycled. In this instance, it is merely necessary that the entraining agent be present in amount sufficient to distill together with the water and it may be used in a proportion as small as desired, relative to the amount of 1,1'-oxybis-(2-chloroethanol) to be dehydrated, i. e. the 1,1'-oxybis-(2-chloroethanol) may be fed in continuous manner to the distillation system containing such inventory of entraining agent and anhydrous chloroacetaldehyde be withdrawn.

The mixture is heated under conditions of temperature and pressure such as to distill at temperatures between 40° C. and 70° C., water together with at least a portion of the inert water-immiscible entraining agent. Such distillation may be accomplished by heating the mixture at atmospheric pressure, subatmospheric pressure, or under a slight superatmospheric pressure, depending on the entraining agent used. For instance, when employing methylene chloride as the water-entraining agent the reaction may advantageously be carried out under a pressure of from 10 to 45 inches of Hg, gauge, so as to produce a temperature of from 50° C. to 70° C. in the reaction vessel and the water removed as distillate together with a portion of the methylene chloride.

The distillation is preferably carried out at atmospheric pressure until the dehydration is substantially complete. The remaining entraining agent is usually distilled from the residue under reduced pressure, so as to avoid heating of the chloroacetaldehyde at temperatures above 85° C. Prolonged heating at 85° C., or at higher temperatures causes polymerization of a substantial portion of the chloroacetaldehyde, together with formation of decomposition products which are difficult to separate from each other and results in lower yields of chloroacetaldehyde. After removal of the entraining agent the anhydrous chloroacetaldehyde may be recovered, preferably by continuing the distillation at subatmospheric pressure.

The following examples illustrate practice of the invention, but are not to be construed as limiting the scope thereof.

Example 1

A mixture consisting of 1214 grams of solid 1,1'-oxybis-(2-chloroethanol) and 900 grams of chloroform was placed in a round bottom flask equipped with a distilling column and a condenser. The mixture was heated to a temperature of 65° to 70° C. to cause distillation of the chloroform, together with water split from the 1,1'-oxybis-(2-chloroethanol). The chloroform layer of the distillate was separated and returned to the column as reflux. Distillation was continued until the material distilling was clear and apparently free of water. Approximately 116 grams of water was collected in the distillate. The liquid remaining in the reaction vessel was fractionally distilled, first at atmospheric pressure to remove most of the chloroform, and then under a reduced pressure of 200 mm. of Hg absolute. There was obtained 855 grams of recovered chloroform and 1055.5 grams of anhydrous chloroacetaldehyde having the properties:

Boiling point 49°–51° C. at 200 mm. Hg
Specific gravity at 23° C. = 1.236
Index of refraction, $n_D^{35} = 1.4195$

Example 2

To a distilling flask, equipped with a fractionating column and condenser, there was added 600 milliliters of chloroform and 600 milliliters of an aqueous solution having a specific gravity of 1.385 at 25° C., containing by analysis 72.5 per cent by weight chloroacetaldehyde. The mixture was heated to a temperature between 65° C. and 70° C. to distill chloroform together with water, at atmospheric pressure. The aqueous and organic layers of the distillate were separated and the organic layer returned as reflux to the fractionating column. Distillation was continued until the distillate was clear, indicating that substantially all of the water was removed. There was separated 230 milliliters of an aqueous layer having a specific gravity of 1.006 at 25° C. Chloroform and chloroacetaldehyde were separated, by first fractionally distilling the remaining mixture at atmospheric pressure to remove most of the chloroform and then completing the distillation under reduced pressure. There was obtained 558 milliliters of chloroform, 34 milliliters of an intermediate fraction, consisting of a mixture of chloroform and chloroacetaldehyde, distilling at 25° C. to 50° C. at 200 mm. absolute pressure, and 328 milliliters of chloroacetaldehyde distilling at 50° C. at 200 mm. absolute pressure.

Example 3

A mixture consisting of 600 grams of crystalline 1,1'-oxybis-(2-chloroethanol) and 464 grams of methylene chloride were placed in a 1 liter round bottom flask. The mixture was distilled to separate water together with a portion of the methylene chloride, the distillate condensed, and the methylene chloride separated from the aqueous layer and returned to the column as reflux. There was separated 72 milliliters of an aqueous layer having a specific gravity of 1.013 at 25° C. Methylene chloride was recovered from the remaining mixture by fractional distillation at atmospheric pressure and the chloroacetaldehyde distilled at an absolute pressure of 200 mm. of Hg. There was obtained 359.7 grams of chloroacetaldehyde having a specific gravity of 1.253 at 20° C. and 43.5 grams of solid residue. In addition 37.7 grams of chloroacetaldehyde were collected in a cold trap inserted between the receiver and vacuum pump and 40 grams of solid polymerized chloroacetaldehyde were removed from the condenser.

Example 4

A mixture consisting of 1267 grams of an aqueous solution containing 50 per cent by weight chloroacetaldehyde and 344 grams of sec.-butyl chloride was placed in a round bottom flask equipped with a fractionating column and condenser. The mixture was heated to a temperature between 65° C. and 75° C. to distill therefrom, water together with sec.-butyl chloride. The organic layer of the distillate was separated and returned to the distillation column as reflux. There was separated 661.5 grams of an aqueous layer having a specific gravity of 1.093 at 25° C. After removal of substantially all of the water, the sec.-butyl chloride was separated from the remaining mixture by fractional distillation at atmospheric pressure and the chloroacetaldehyde separated by distillation under a reduced pressure of 300 mm. of mercury absolute pressure. There was obtained 344.1 grams of sec.-butyl chloride, 6.8 grams of an intermediate cut consisting chiefly of a mixture of sec.-butyl chloride and chloroacetaldehyde, 276.6 grams of chloroacetaldehyde having a specific gravity of 1.253 at 20° C. and 191.6 grams of tar-like residue. In addition, 104 grams of solid polymerized chloroacetaldehyde were removed from the condenser and 18.9 grams of liquid product collected in a cold trap, cooled with a mixture of solid carbon dioxide and acetone. This latter product was chiefly chloroacetaldehyde.

Anhydrous chloroacetaldehyde is an extremely corrosive chemical to animal tissue. Vapors of the compound in admixture with air, in concentrations of one per cent by volume, are extreme irritants to mucous membrane. Thus, in preparing and using the compound due precaution should be observed to avoid contact with the material or exposure to the vapors. Processes employing the compound should be carried out with adequate ventilation and suitable protective facilities. For laboratory preparations, employing the chemical compound, the reactions may conveniently be carried out under a hood.

Other modes of applying the principle of my invention may be employed instead of those explained, change being made as regards the method or products herein disclosed, provided the steps or products stated in any of the following claims or the equivalent of such stated steps or products be employed.

I therefore particularly point out and distinctly claim as my invention:

1. In a method of making chloroacetaldehyde by causing vinyl chloride and chlorine in gaseous form to react in admixture with water, the steps of distilling the aqueous reaction mixture at from 100 to 300 mm. of Hg, absolute pressure, separating as distillate chloroacetaldehyde in concentration of at least 50 per cent by weight, mixing the distillate with a water-immiscible entraining agent selected from the group consisting of chloroform, sec.-butyl chloride, ethylidene chloride, n-propyl chloride and methylene chloride, heating the mixture at temperatures between 40° and 85° C. to distill therefrom, water together with a portion of the entraining agent at temperatures between 40° and 70° C., and carrying the distillation to a point until substantially anhydrous chloroacetaldehyde remains in the residue.

2. In a method of making chloroacetaldehyde by causing vinyl chloride and chlorine in gaseous form to react in admixture with water, the steps of distilling the aqueous reaction mixture at from 100 to 300 mm. of Hg, absolute pressure, separating as distillate chloroacetaldehyde in concentration of at least 50 per cent by weight, mixing the distillate with chloroform, heating the mixture at temperatures between 40° and 85° C., separating therefrom by distillation, water together with a portion of the chloroform and thereafter recovering anhydrous chloroacetaldehyde from the remaining chloroform.

3. A method of dehydrating 1,1'-oxybis-(2-chloroethanol) which comprises, mixing the compound with an inert water-immiscible entraining agent having a boiling point between 40° and 70° C., selected from the group consisting of chloroform, sec.-butyl chloride, ethylidene chloride, n-propyl chloride, and methylene chloride, heating the mixture at temperatures between 40° and 85° C. to distill therefrom water together with a portion of the entraining agent at temperatures between 40° and 70° C., and carrying the distillation to a point until substantially anhydrous chloroacetaldehyde remains in the residue.

4. A method of dehydrating 1,1'-oxybis-(2-chloroethanol) which comprises heating the compound in admixture with chloroform at temperatures between 40° and 85° C., and separating from the reaction mixture by distillation, water together with a portion of the chloroform.

5. A method of dehydrating 1,1'-oxybis-(2-chloroethanol) which comprises heating the compound in admixture with ethylidene chloride at temperatures between 40° and 85° C., and separating from the reaction mixture by distillation, water together with a portion of the ethylidene chloride.

6. In a method of making anhydrous chloroacetaldehyde the steps of mixing an aqueous solution containing at least 50 per cent by weight chloroacetaldehyde with an inert water-immiscible entraining agent having a boiling point between 40° and 70° C., selected from the group consisting of chloroform, sec.-butyl chloride, ethylidene chloride, n-propyl chloride, and methylene chloride, heating the mixture at temperatures between 40° and 85° C. to distill therefrom, water together with a portion of the entraining agent at temperatures between 40° and 70° C., carrying the distillation to a point until substantially anhydrous chloroacetaldehyde remains in the residue and thereafter recovering chloroacetaldehyde from the residue.

7. In a method of making anhydrous chloroacetaldehyde the improvement which comprises heating 1,1'-oxybis-(2-chloroethanol) in admixture with chloroform at temperatures between 40° and 85° C., separating from the reaction mixture by distillation, water split from the 1,1'-oxybis-(2-chloroethanol) together with a portion of the chloroform and thereafter separating chloroacetaldehyde from the remaining chloroform.

8. In a method of making anhydrous chloroacetaldehyde the improvement which comprises heating an aqueous solution containing at least 50 per cent 1,1'-oxybis-(2-chloroethanol) in admixture with methylene chloride at temperatures between 40° and 85° C., separating from the mixture by distillation, water together with a portion of the methylene chloride and thereafter separating chloroacetaldehyde from the remaining methylene chloride.

STEPHEN C. STOWE.

REFERENCES CITED

The following references are of record in the file of this patent:

UNITED STATES PATENTS

| Number | Name | Date |
| --- | --- | --- |
| 1,424,138 | Bailey | July 25, 1922 |
| 1,676,735 | Keyes | July 10, 1928 |
| 1,744,504 | Ricard | Jan. 21, 1930 |
| 1,774,507 | Ernst et al. | Sept. 2, 1930 |
| 1,854,568 | Walter | Apr. 19, 1932 |
| 2,031,637 | Dreyfus | Feb. 25, 1936 |
| 2,179,059 | Slagh | Nov. 7, 1939 |
| 2,462,404 | Weiss | Feb. 22, 1949 |